US008251406B2

(12) United States Patent
Kawano

(10) Patent No.: US 8,251,406 B2
(45) Date of Patent: Aug. 28, 2012

(54) DISCHARGE ELBOW PROVIDED WITH GUIDE VANES

(75) Inventor: Michihiko Kawano, Fukuoka (JP)

(73) Assignee: Kawano Giken Co., Ltd., Fukuoka (JP)

( * ) Notice: Subject to any disclaimer, the term of this patent is extended or adjusted under 35 U.S.C. 154(b) by 139 days.

(21) Appl. No.: 12/776,093

(22) Filed: May 7, 2010

(65) Prior Publication Data

US 2011/0241334 A1 Oct. 6, 2011

(30) Foreign Application Priority Data

Apr. 4, 2010 (JP) ................................. 2010-086619

(51) Int. Cl.
*F16L 43/00* (2006.01)

(52) U.S. Cl. .......... 285/179; 285/183; 138/39; 406/191; 406/195

(58) Field of Classification Search .................. 285/179, 285/183; 138/37, 39; 406/191, 195
See application file for complete search history.

(56) References Cited

U.S. PATENT DOCUMENTS

| | | | | |
|---|---|---|---|---|
| 2,216,046 | A * | 9/1940 | Peck | 285/179 |
| 4,919,170 | A * | 4/1990 | Kallinich et al. | 138/39 |
| 5,531,484 | A | 7/1996 | Kawano | |
| 6,290,266 | B1 * | 9/2001 | Kawano | 285/179 |
| 6,668,580 | B2 * | 12/2003 | MacBain | 138/37 |
| 7,556,009 | B2 * | 7/2009 | Niakan et al. | 285/179 |

FOREIGN PATENT DOCUMENTS

| | | |
|---|---|---|
| JP | 2706222 | 10/1997 |

OTHER PUBLICATIONS

"Numerical Analysis of Wind Concentration Around Wind Turbines Shrouded by Brimmed Diffuser" (Collection of papers read at a symposium on computational fluid dynamics,) Kyushu University, 2003, pp. 1-4.

* cited by examiner

*Primary Examiner* — David E Bochna
(74) *Attorney, Agent, or Firm* — Griffin & Szipl, P.C.

(57) ABSTRACT

A discharge elbow provided with guide vanes includes an elbow of rectangular cross section and magnification f of 1<f≦5, one or more guide vanes disposed in the elbow, wherein the guide vane or the guide vanes are made of a curved plate and a pair of flat plates connected to the curved plate. One of the flat plates is located in front of the curved plate and the other is located to the rear of the curved plate. M-number of sub-channels similar to one another are formed in the elbow based on particular formulas, wherein the inner sidewall of the elbow is deformed into a curved plate coaxial with the curved plate of the adjacent guide vane to deform n=1 sub-channel into a coaxial bend channel provided with a uniform breadth equal to the inlet breadth $b_1$ of the sub-channel.

3 Claims, 8 Drawing Sheets

PRIOR ART

DISCHARGE ELBOW PROVIDED WITH GUIDE VANES

This application claims priority from Japanese Patent Application No. 2010-086619, filed Apr. 4, 2010, the entire disclosure of which is incorporated herein by reference.

BACKGROUND OF THE INVENTION

The present invention relates to a discharge elbow provided with guide vanes to be disposed in a pipeline, a duct, etc.

Expansion ducts for rectifying and decelerating fluid flow include diffusers (straight ducts), expansion elbows (right angled bent ducts), etc.

The technical characteristics of the diffuser have been elucidated. A diffuser pump wherein diffuser guide vanes are disposed around an impeller is the most popular example of the application of the diffuser. The diffuser pump has an advantage in that the guide vanes effectively decelerate high-speed liquid discharging from the impeller to convert high velocity head to pressure head. Therefore, the diffuser pump has the advantage of restoring hydrostatic pressure, thereby increasing pump head. Another popular example of the application of the diffuser is a diffuser duct used in a wind tunnel. The diffuser duct decelerates high-speed airflow discharging from a blower to restore hydrostatic pressure.

However, development of rectification technology by an expansion elbow has not been achieved though it has been strongly desired. In order to solve this problem, the inventor of the present invention proposed a discharge elbow provided with guide vanes in the patent document No. 1.

Patent document No. 1: Japanese Patent No. 2706222 (U.S. Pat. No. 5,531,484)

The discharge elbow provided with guide vanes of the patent document No. 1 comprises an elbow of rectangular cross section and magnification f of $1<f\leqq 5$, and one or more guide vanes disposed in the elbow, while the guide vane or the guide vanes are made of a curved plate and a pair of flat plates connected to the curved plate, with one of them being located in front of the curved plate and the other being located to the rear of the curved plate, wherein the inner sidewall of the elbow, the outer sidewall of the elbow and the guide vane or the guide vanes cooperate to define m number of sub-channels similar to one another based on the following formulas.

$$p=h/\{[f/(f-r)]^m-1\} \quad (1)$$

$$a_n=pr[f/(f-r)]^n \quad (2)$$

$$b_n=a_n/f \quad (3)$$

p: overhang length at the outlet of the elbow
h: inlet breadth of the elbow
W: outlet breadth of the elbow
f: magnification of the elbow (f=W/h)
r: aspect ratio of the sub-channels (r<f)
m: number of sub-channels ($m\geqq 2$)
$a_n$: outlet breadth of n-th sub-channel ($a_0$ indicates the radius of curvature of the inner sidewall and $a_m$ indicates the radius of curvature of the outer sidewall)
$b_n$: inlet breadth of n-th sub-channel FIG. 1 shows an expansion elbow 1, which is an example of the discharge elbow provided with guide vanes of the patent document No. 1.

In the expansion elbow 1, guide vanes 5, 6 and 7 are right angled curved guide plates each of them being made of a quarter circular curved plate and a pair of flat plates connected to the curved plate, with one of them being located in front of the curved plate and the other being located to the rear of the curved plate.

In FIG. 1, the aspect ratio r of the sub-channels means $A_1C_1/A_1A_2$, $A_2C_2/A_2A_3$, $A_3C_3/A_3A_4$ . . . in rectangles $A_1C_1B_2A_2$, $A_2C_2B_3A_3$, $A_3C_3B_4A_4$ . . . . .

The discharge elbow of the patent document No. 1 achieves a discharge of uniform parallel flow, wherein velocity distribution is uniform and flow direction is concentrated in one direction by disposing one or more guide vanes in the elbow to make a plurality of sub-channels similar to one another.

The discharge elbow provided with guide vanes of the patent document No. 1 can be used for any one of a reduction elbow (magnification f: f<1), a normal elbow (magnification f: f=1), or an expansion elbow (magnification f: $1<f\leqq 25$). Of particular note is that the expansion discharge elbow provided with guide vanes has good potential in various fields.

The discharge elbow provided with guide vanes of the patent document No. 1 has a problem in that a separation vortex survives in n=1 sub-channel along the inner sidewall of the elbow to stagnate the flow there. Therefore, partial absence of air curtain, partial accumulation of dust, etc. may occur when the discharge elbow provided with guide vanes of the patent document No. 1 is used in an air curtain, a heat exchanger, etc.

The flow line of the discharge elbow provided with guide vanes of FIG. 1 is shown in FIG. 2. Fluid enters into the expansion elbow 1 through the inlet 2 of the elbow to separately enter into four sub-channels formed by the inner sidewall 4, the guide vanes 5, 6 and 7 and the outer sidewall 8, thereby being decelerated. Separation vortices, each thereof being formed by a plurality of small vortices, are generated along the convex rear surfaces of the inner sidewall 4 and the guide vanes 5, 6 and 7 to stagnate at the location of the outlet 3 of the elbow. High-speed fluid flowing along the concave front surfaces of the guide vanes 5, 6 and 7 contacts and attracts the separation vortices generated along the convex rear surfaces of the guide vanes 5, 6 and 7 at the location of the outlet 3 of the elbow to form a fixed single vortex 10 in n=2 sub-channel, a fixed single vortex 11 in n=3 sub-channel and a fixed single vortex 12 in n=4 sub-channel at the location of the outlet 3 of the elbow. The sizes of the fixed single vortex 10, the fixed single vortex 11 and the fixed single vortex 12 are in proportion to the sizes of the sub-channels. The centers of the fixed single vortex 10, the fixed single vortex 11 and the fixed single vortex 12 are aligned on a straight line formed by the outlet 3 of the elbow and extending at right angles to the discharge direction of the elbow. Regarding the phenomenon of a separation vortex being changed into a fixed single vortex by the attraction of high-speed flow of fluid, a paper titled "Numerical Analysis of Wind Concentration around Wind Turbines Shrouded by Brimmed Diffuser" (Collection of papers read at a symposium on computational fluid dynamics, Kyushu University, Masato FURUYA, et al. 2003) reports a method for increasing flow rate of discharge air from a generator wind turbine, wherein the generator wind turbine is provided with a diffuser shroud, and a separation vortex formed inside the shroud is attracted by high-speed external air flow to be changed into a fixed single vortex, thereby increasing flow rate.

In the n=2 sub-channel, n=3 sub-channel and n=4 sub channel, flows adjacent the fixed single vortex 10, the fixed single vortex 11 and the fixed single vortex 12 go around them to be decelerated and enlarged without being contracted, thereby becoming uniform parallel flows.

However, in the n=1 sub-channel, a separation vortex 9 generated along the convex rear surface of the inner sidewall 4 of the elbow survives without being changed into a fixed single vortex because of the absence of an adjacent high-speed flow of the fluid to expand along a duct wall extending downstream of the inner sidewall of the elbow beyond the outlet 3 of the elbow. The separation vortex contracts and disappears as the distance from the outlet 3 of the elbow increases.

FIG. 3 shows the velocity distribution of the fluid corresponding to the flow line of FIG. 2. The centers of the fixed single vortex 10, the fixed single vortex 11 and the fixed single vortex 12 and the separation vortex 9 lie at the location X0 coinciding with the location of the outlet 3 of the elbow. At the location X1 downstream of the regions of the fixed single vortex 10, the fixed single vortex 11 and the fixed single vortex 12, high-speed flows with the same velocity along the concave front surfaces of the guide vanes 5, 6 and 7 coexist with decelerated flows formed by the flows going around the fixed single vortex 10, the fixed single vortex 11 and the fixed single vortex 12 to be enlarged to form a wave-shaped velocity distribution. The high-speed flow along the concave front surface of the outer sidewall 8 of the elbow becomes a flow along a wall to be scarcely decelerated. The separation vortex 9 along the convex rear surface of the inner sidewall 4 of the elbow survives to form a reverse flow along a duct wall downstream of the inner sidewall of the elbow. At the location X2 downstream of the location X1, the velocity distribution becomes uniform and parallel except in the region close to the duct wall downstream of the inner sidewall of the elbow. However, the reverse flow survives along the duct wall downstream of the inner sidewall of the elbow. The reverse flow damps as the distance from the outlet 3 of the elbow increases.

FIG. 4 shows a decelerated jet flow blowing out of a discharge elbow provided with guide vanes with magnification f being equal to 5 when a high-speed airflow with the velocity of 12 m/sec. flows into the elbow. Each fixed single vortex formed at the location of the outlet 3 of the elbow shown in FIG. 3 is made visible as each transparent portion. The each fixed single vortex is made visible for a very short time less than one second just after white smoke is put into the airflow and just before the each fixed single vortex is filled with the white smoke and made invisible after the each single fixed vortex is filled with white smoke. It can be seen from FIG. 4 that the decelerated jet flow shown in FIG. 4 is generally in a form of rectangle in good order and lines of the flows of the discharge air are concentrated in the same direction. No white smoke can be seen in the left end portion of the outlet 3 of the discharge elbow corresponding to the n=1 sub-channel because of the reverse flow. Therefore, when the elbow is used independently for blowing out a jet flow, the n=1 sub-channel does not operate as an outlet of the elbow. In either the case where the elbow is used independently for blowing out a jet flow or the case where the elbow is used in a duct, absence of outlet flow occurs in the n=1 sub-channel extending along the inner sidewall of the elbow.

As seen from the foregoing description, although the discharge elbow provided with guide vanes of the patent document No. 1 enables the outlet of uniform parallel flows from sub-channels except n=1 sub-channel by means of providing the elbow with right angled curved guide vanes to divide the internal space of the elbow into a plurality of sub-channels similar to one another, thereby making the high-speed fluid flowing along the concave front surfaces of the guide vanes attract the separation vortices generated along the convex rear surfaces of the guide vanes to change each of the separation vortices into a fixed single vortex respectively, it has a problem in that the n=1 sub-channel experiences absence of outlet flow because of the survival of the separation vortex.

SUMMARY OF THE INVENTION

An object of the present invention is to provide a discharge elbow provided with guide vanes capable of achieving the outlet of uniform parallel flow, while avoiding the absence of outlet flow.

In accordance with the present invention, there is provided a discharge elbow provided with guide vanes comprising an elbow of rectangular cross section and magnification f of $1<f\leqq5$, and one or more guide vanes disposed in the elbow, while the guide vane or the guide vanes are made of a curved plate and a pair of flat plates connected to the curved plate, with one of them being located in front of the curved plate and the other being located to the rear of the curved plate, wherein m number of sub-channels similar to one another are formed in the elbow based on the following formulas, whereafter the inner sidewall of the elbow is deformed into a curved plate coaxial with the curved plate of the adjacent guide vane to deform n=1 sub-channel into a coaxial bend channel provided with a uniform breadth equal to the inlet breadth $b_1$ of the sub-channel.

$$p=h/\{[f/(f-r)]^m-1\} \quad (1)$$

$$a_n=pr[f/(f-r)]^n \quad (2)$$

$$b_n=a_n/f \quad (3)$$

p: overhang length at the outlet of the elbow
h: inlet breadth of the elbow
W: outlet breadth of the elbow
f: magnification of the elbow (f=W/h)
r: aspect ratio of the sub-channels (r<f)
m: number of sub-channels ($m\geqq2$)
$a_n$: outlet breadth of n-th sub-channel ($a_0$ indicates the radius of curvature of the inner sidewall and $a_m$ indicates the radius of curvature of the outer sidewall)
$b_n$: inlet breadth of n-th sub-channel In the present invention, the n=1 sub-channel of the discharge elbow provided with guide vanes of the patent document No. 1 is deformed into a coaxial bend channel provided with a uniform breadth equal to hi to form a high-speed sub-channel extending adjacent the n=2 sub-channel and along the inner sidewall of the elbow, thereby making high-speed fluid flowing in the high-speed sub-channel attract the separation vortex in the n=2 sub-channel to change it into a fixed single vortex, thereby creating a fixed single vortex in each of the $n\geqq2$ sub-channels and also preventing generation of the separation vortex along the inner sidewall of the elbow to achieve the outlet of uniform parallel flow, while avoiding the absence of outlet flow.

In accordance with a preferred embodiment of the present invention, there is provided a duplex discharge elbow provided with guide vanes with magnification f of $1<f\leqq25$, wherein a pair of the aforementioned discharge elbows are connected with each other in tandem.

When a discharge elbow in accordance with the present invention is connected to another discharge elbow in accordance with the present invention in tandem, magnification of the elbow is markedly increased.

DETAILED DESCRIPTION OF THE PREFERRED EMBODIMENTS

A discharge elbow provided with guide vanes in accordance with a preferred embodiment of the present invention will be described.

Figure 1:
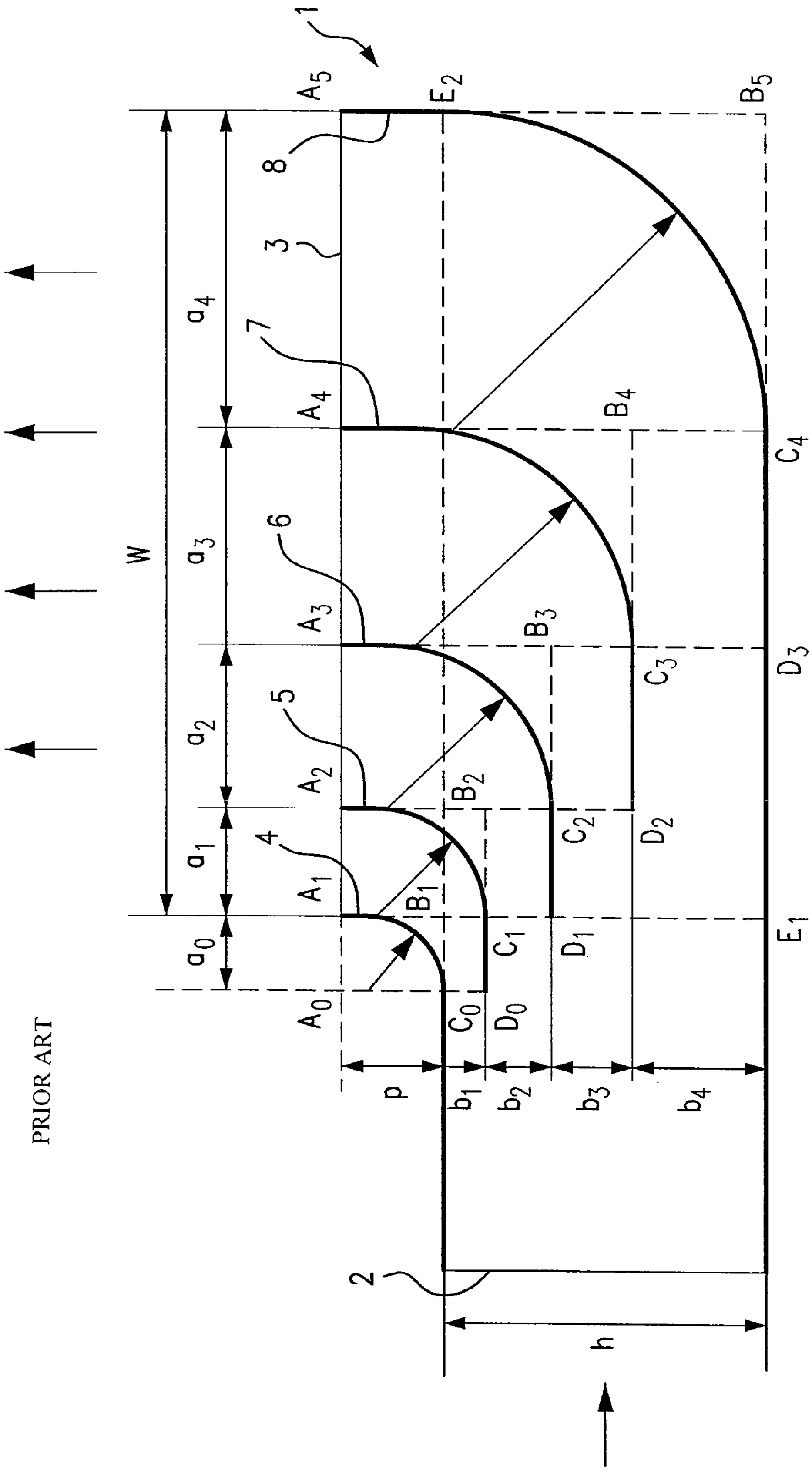
PRIOR ART FIG. 1
FIG. 1 is a structural view of a discharge elbow provided with guide vanes of the patent document No. 1.
Figure 2:
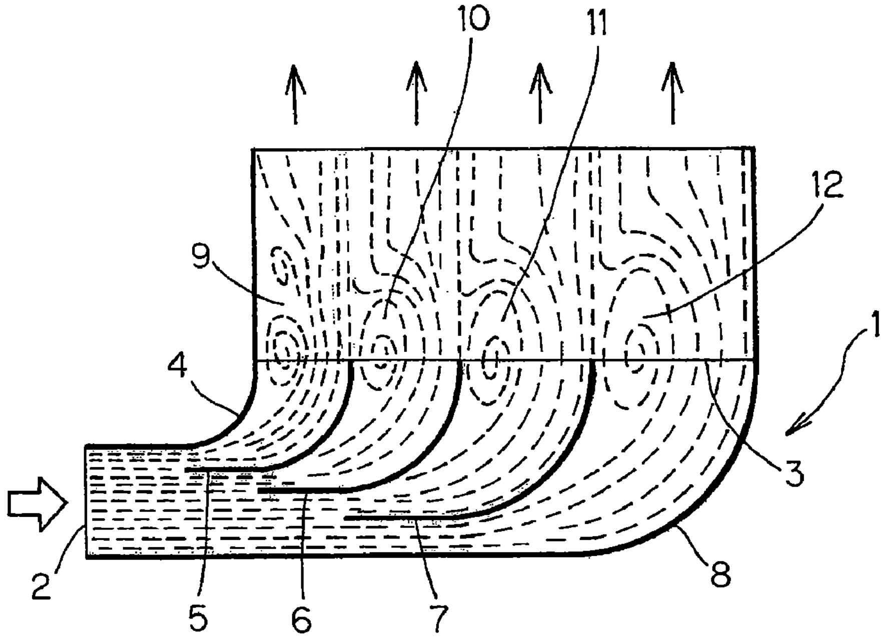
FIG. 2 PRIOR ART
FIG. 2 is a view showing flow lines of the discharge elbow provided with guide vanes of the patent document No. 1.
Figure 3:
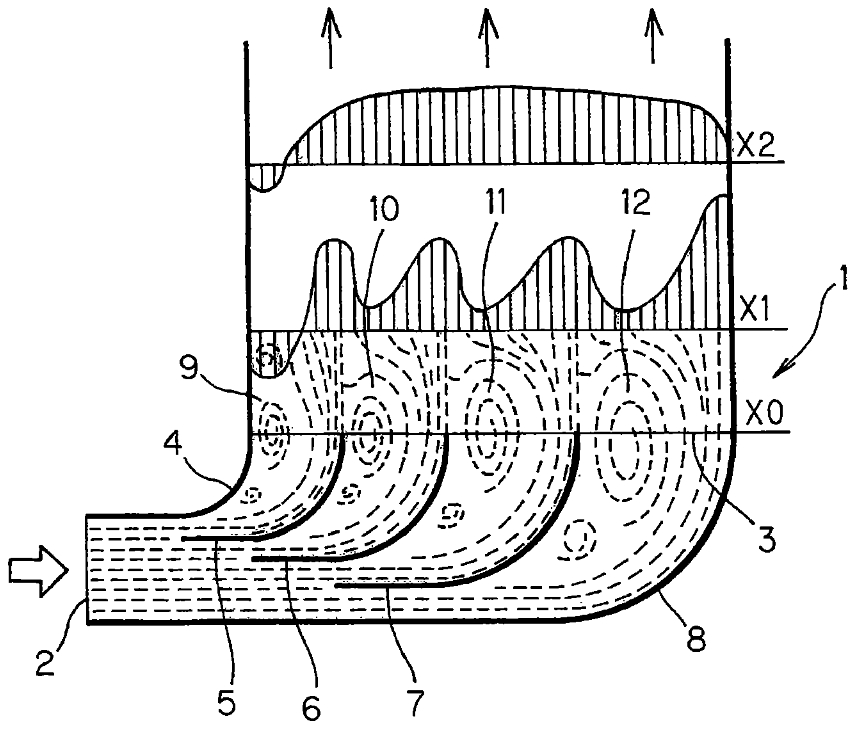
FIG. 3 PRIOR ART
FIG. 3 is a view showing velocity distribution of the discharge elbow provided with guide vanes of the patent document No. 1.
Figure 4:
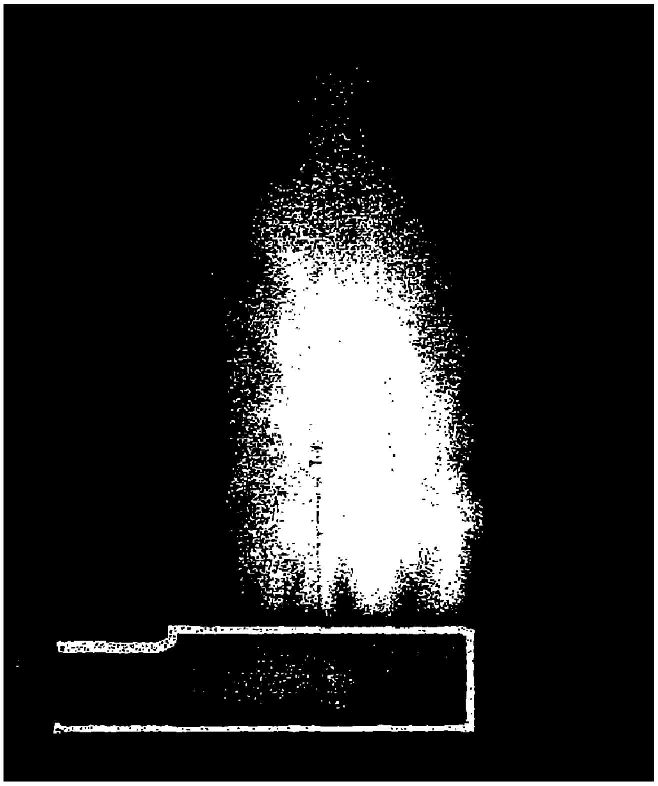
FIG. 4 is a photo showing a jet flow of the discharge elbow provided with guide vanes of the patent document No. 1.
Figure 5:
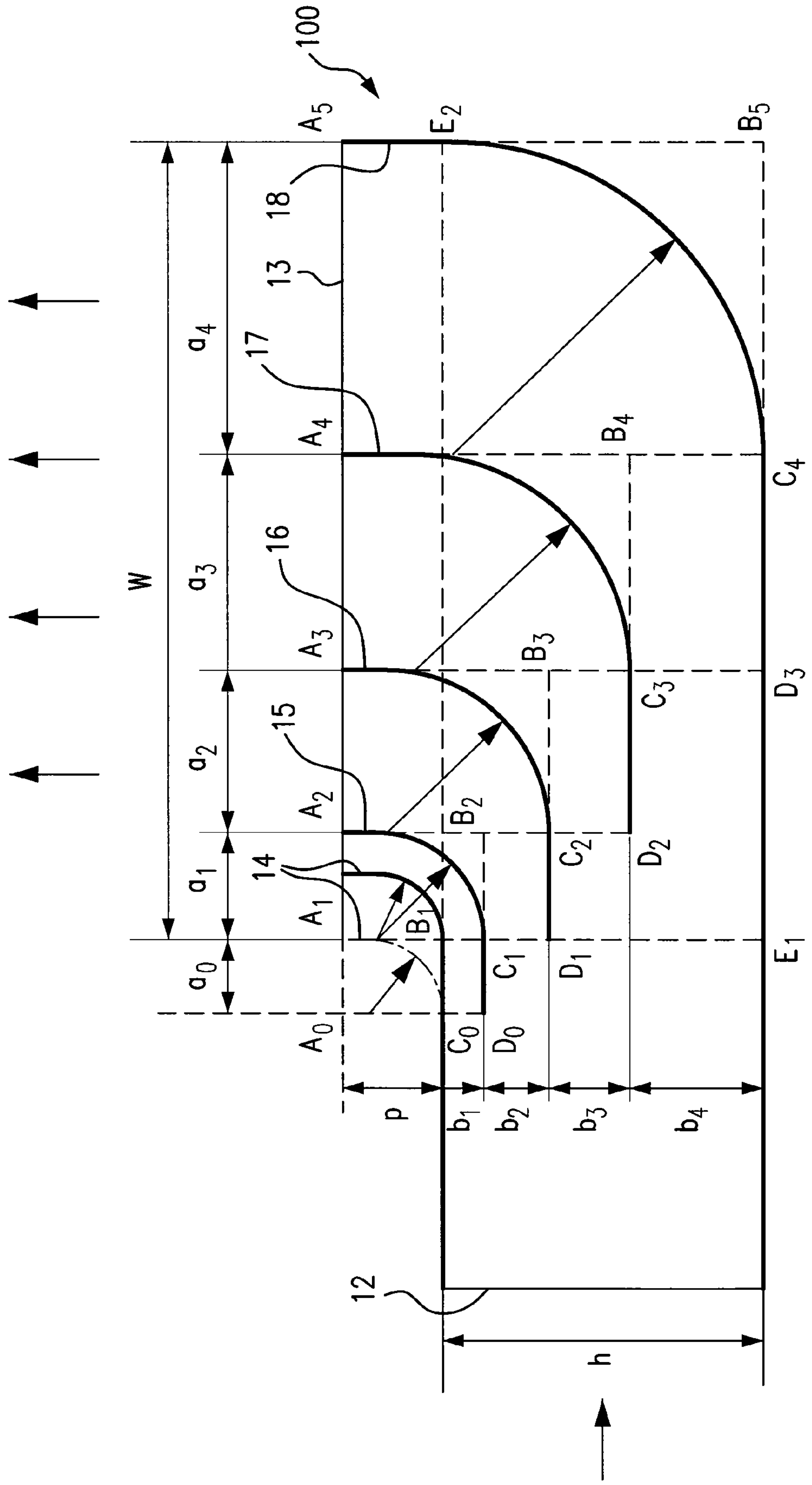
FIG. 5 is a structural view of a discharge elbow provided with guide vanes in accordance with a preferred embodiment of the present invention.

As shown in FIG. 5, in a discharge expansion elbow provided with guide vanes 100 formed in accordance with the same formulas as those in the patent document No. 1, the inner sidewall 14 of the elbow is deformed into a curved plate coaxial with the curved plate of the adjacent guide vane 15 to deform the n=1 sub-channel into a coaxial bend channel provided with a uniform breadth equal to the inlet breadth $b_1$ of the sub-channel.

Figure 6:
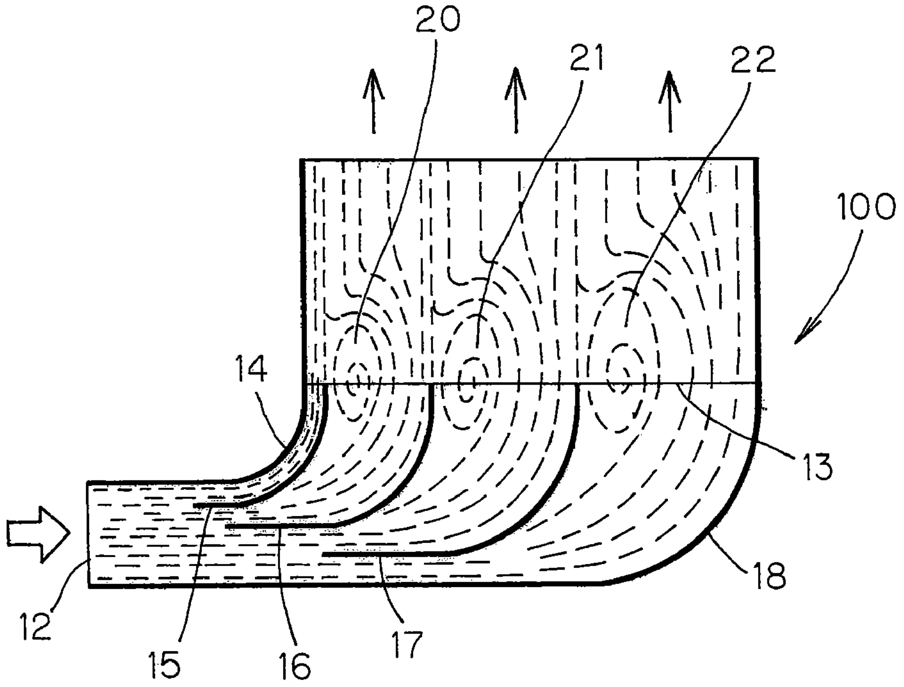
FIG. 6 is a view showing flow lines of the discharge elbow provided with guide vanes in accordance with the preferred embodiment of the present invention.

The flow lines of the discharge expansion elbow provided with guide vanes 100 of FIG. 5 are shown in FIG. 6. Fluid enters into the elbow 100 through the inlet 12 of the elbow to separately enter into each sub-channel, and thereafter flows out of the elbow 100 through the outlet 13 of the elbow. The fluid flowing out of the n=3 sub-channel and the n=4 sub-channel forms a fixed single vortex 21 and a fixed single vortex 22 at the location of the outlet 13 of the elbow, and thereafter goes around the fixed single vortex 21 and the fixed single vortex 22 to be decelerated and enlarged, thereby making uniform parallel flows. The fluid flowing out of the n=2 sub-channel is attracted by high-speed fluid flowing out of the n=1 sub-channel, i.e. a coaxial bend channel with uniform breadth, to form a fixed single vortex 20 at the location of the outlet 13 of the elbow, and thereafter goes around the fixed single vortex 20 to be decelerated and enlarged, thereby making a uniform parallel flow. The fluid flowing out of the n=1 sub-channel, i.e. a coaxial bend channel with uniform breadth, keeps a flow along the inner sidewall of the elbow, and thereafter becomes enlarged. Separation vortex is not generated along the inner sidewall of the elbow. The fluid flowing out of the elbow along the outer sidewall 18 of the elbow also keeps a flow along the outer sidewall 18 of the elbow, and thereafter becomes enlarged.

Figure 7:
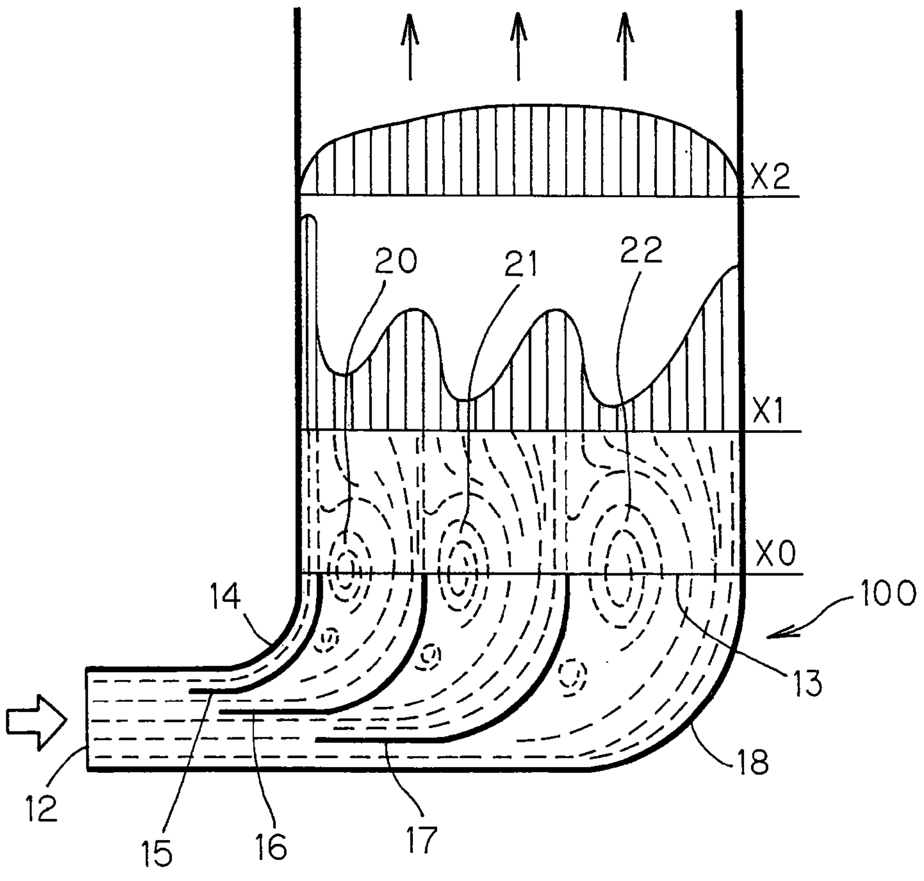
FIG. 7 is a view showing velocity distribution of the discharge elbow provided with guide vanes in accordance with the preferred embodiment of the present invention.

FIG. 7 shows the velocity distribution of the fluid corresponding to the flow lines of FIG. 6. A fixed single vortex street formed by the fixed single vortex 20, the fixed single vortex 21 and the fixed single vortex 22 similar to one another is formed at the location X0, i.e. the location of outlet 13 of the elbow. At the location X1 downstream of the location X0, velocities along the inner sidewall 14 and the outer sidewall 18 are large, while a stable wave-shaped velocity distribution is formed in the middle portion between the inner sidewall 14 and the outer sidewall 18, wherein the maximum velocities are the same as each other. Absence of flow does not occur near the inner sidewall of the elbow. As a result, the velocity distribution becomes a uniform parallel velocity distribution without absence of flow at the location X2 downstream of the location X1.

Figure 8:
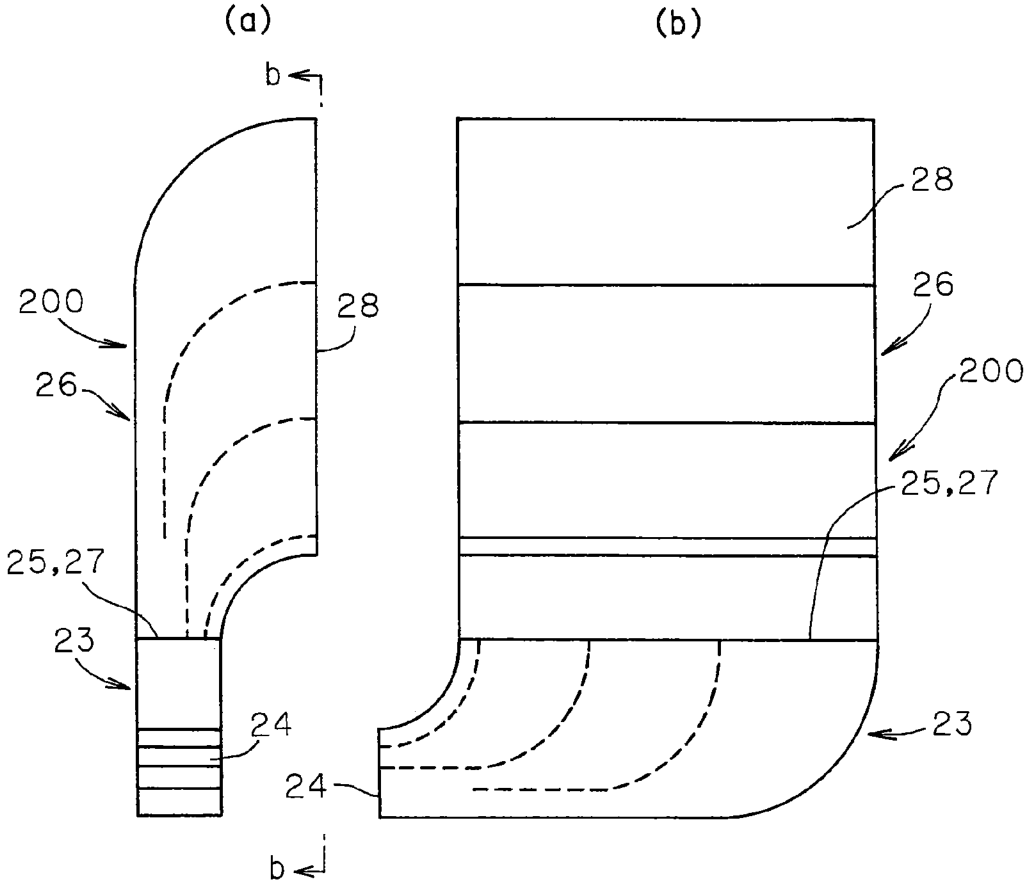
FIG. 8 is a set of structural views of a duplex discharge elbow provided with guide vanes in accordance with a preferred embodiment of the present invention. (a) is a side view and (b) is a view in the direction of arrows b-b in (a).

FIG. 8 shows a duplex discharge elbow provided with guide vanes in accordance with a preferred embodiment of the present invention.

A duplex discharge elbow provided with guide vanes 200 comprises a first discharge elbow provided with guide vanes 23 in accordance with a preferred embodiment of the present invention. The first elbow 23 comprises an inlet 24 and an outlet 25. The duplex discharge elbow provided with guide vanes 200 comprises a second discharge elbow provided with guide vanes 26 in accordance with a preferred embodiment of the present invention. The second elbow 26 comprises an inlet 27 and an outlet 28. The first elbow 23 and the second elbow 26 are connected with each other in tandem, with the outlet 25 of the first elbow 23 abutting the inlet 27 of the second elbow 26 and the outlet 28 of the second elbow 26 being directed at right angles to the inlet 24 of the first elbow 23. Magnification f of the first and second elbows is f=5. Therefore, the ratio of the cross sectional area of the outlet 28 to that of the inlet 24 of the duplex discharge elbow provided with guide vanes 200 is 25 to 1. The duplex discharge elbow provided with guide vanes 200 is useful for an outlet of a car air conditioner unit, etc. as an elbow for sharp expansion.

INDUSTRIAL APPLICABILITY

The present invention can be used for the fluid inlet of various kinds of industrial apparatuses, the outlet of decelerated jet flow of wind tunnels, air curtains, etc., the high-speed exhaust gas deceleration device for gas turbines, electric power plants, etc., the rectifying device for the air box of combustion apparatuses, drying apparatuses, etc. to contribute to enhancement of their efficiency and miniaturization. The effect of restoring hydrostatic pressure of the present elbow due to the deceleration effect of the expansion elbow helps to reduce load acting on fans, pumps, etc. to achieve energy saving.

The invention claimed is:

1. A discharge elbow provided with guide vanes, comprising:

(a) an elbow of rectangular cross section and magnification f of $1<f\leqq 5$; and (b) one or more guide vanes disposed in the elbow, wherein the one or more guide vanes are made of a first curved plate and a pair of flat plates connected to the first curved plate, wherein one of the flat plates is located in front of the first curved plate and the other one of the flat plates is located to the rear of the first curved plate, wherein m number of sub-channels similar to one another are formed in the elbow based on the following formulas (1), (2) and (3), $$p=h/\{[f/(f-r)]^m-1\} \quad (1), \text{ and}$$

$$a_n=pr[f/(f-r)]^n \quad (2), \text{ and}$$

$$b_n=a_n/f \quad (3),$$

wherein, p is an overhang length at an outlet of the elbow;

h is an inlet breadth of the elbow;

W is an outlet breadth of the elbow;

f is a magnification of the elbow, wherein f=W/h;

r is an aspect ratio of the sub-channels, wherein r<f;

m is a number of the sub-channels, wherein m≧2;

$a_n$ is an outlet breadth of an n-th sub-channel, wherein $a_0$ indicates a radius of curvature of an inner sidewall of the elbow and $a_m$ indicates a radius of curvature of an outer sidewall of the elbow; and $b_n$ is an inlet breadth of an n-th sub-channel; and wherein the inner sidewall of the elbow is deformed into a second curved plate coaxial with the first curved plate of the adjacent guide vane to deform n=1 sub-channel into a coaxial bend channel provided with a uniform breadth equal to the inlet breadth $b_1$ of the sub-channel.

2. A duplex discharge elbow with magnification f of 1<f≦25, wherein a first discharge elbow provided with guide vanes is connected in tandem to a second discharge elbow provided with guide vanes, wherein the outlet of the first elbow forms the same shape as that of the inlet of the second elbow and abuts the inlet of the second elbow, and the outlet of the second elbow is directed at right angles to the inlet of the first elbow, wherein the first discharge elbow is the discharge elbow provided with guide vanes according to claim 1, and the second discharge elbow provided with guide vanes comprises:

(a) an elbow of rectangular cross section and magnification f' of 1<f'≦5; and (b) one or more guide vanes disposed in the elbow, wherein the one or more guide vanes are made of a third curved plate and a pair of flat plates connected to the third curved plate, wherein one of the flat plates is located in front of the third curved plate and the other one of the flat plates is located to the rear of the third curved plate, wherein m' number of sub-channels similar to one another are formed in the elbow based on the following formulas (4), (5) and (6), $$p'=h'/\{[f/(f'-r')]^{m'}-1\} \quad (4), \text{ and}$$

$$a_n'=p'r'[f'/(f'-r')]^{n'} \quad (5), \text{ and}$$

$$b_n'=a_n'/f' \quad (6),$$

wherein, p' is an overhang length at an outlet of the elbow;

h' is an inlet breadth of the elbow;

W' is an outlet breadth of the elbow;

f' is a magnification of the elbow, wherein f'=W'/h';

r' is an aspect ratio of the sub-channels, wherein r'<f';

m' is a number of the sub-channels, wherein m'≧2;

$a_n'$ is an outlet breadth of an n'-th sub-channel, wherein $a_0'$ indicates a radius of curvature of an inner sidewall of the elbow and $a_m'$ indicates a radius of curvature of an outer sidewall of the elbow; and $b_n'$ is an inlet breadth of an n'-th sub-channel; and wherein the inner sidewall of the elbow is deformed into a fourth curved plate coaxial with the third curved plate of the adjacent guide vane to deform n'=1 sub-channel into a coaxial bend channel provided with a uniform breadth equal to the inlet breadth $b_1'$ of the sub-channel.

3. A discharge elbow provided with guide vanes according to claim 1, wherein a velocity distribution of fluid flowing within the discharge elbow includes a first velocity along the inner sidewall and a second velocity along the outer sidewall, and a wave-shaped velocity distribution located in a middle portion between the inner sidewall and the outer sidewall, wherein each of the first velocity and the second velocity are larger than a maximum of the wave-shaped velocity distribution of the middle portion.

* * * * *